US012654859B2

(12) United States Patent
Wall

(10) Patent No.: US 12,654,859 B2
(45) Date of Patent: Jun. 16, 2026

(54) AIRCRAFT MONUMENT ATTACHMENT APPARATUS

(71) Applicant: B/E Aerospace (UK) Limited, Leighton Buzzard (GB)

(72) Inventor: Daniel H. Wall, Baldock (GB)

(73) Assignee: B/E AEROSPACE (UK) LIMITED, Leighton Buzzard (GB)

( * ) Notice: Subject to any disclaimer, the term of this patent is extended or adjusted under 35 U.S.C. 154(b) by 0 days.

(21) Appl. No.: 18/770,233

(22) Filed: Jul. 11, 2024

(65) Prior Publication Data

US 2025/0100682 A1 Mar. 27, 2025

(30) Foreign Application Priority Data

Sep. 22, 2023 (EP) ..................................... 23275140

(51) Int. Cl.
B64D 11/00 (2006.01)
(52) U.S. Cl.
CPC ..................................... B64D 11/00 (2013.01)
(58) Field of Classification Search
CPC ......... B64D 11/00; B64D 11/02; B64D 11/04; B64D 11/0696
See application file for complete search history.

(56) References Cited

U.S. PATENT DOCUMENTS 4,456,206 A 6/1984 Tijssen
5,520,357 A * 5/1996 Payne .................. B61D 45/006
244/118.6

7,374,131 B2 * 5/2008 Tiid ....................... B64D 9/003
411/398
7,614,583 B2 11/2009 White
9,174,735 B2 11/2015 Klepka
10,518,862 B2 12/2019 Burd
10,696,403 B2 6/2020 Payne et al.
11,926,420 B2 * 3/2024 Skelly ................ B64D 11/0023
2010/0308190 A1 * 12/2010 Tkocz .................... B64D 11/04
248/222.14

(Continued)

FOREIGN PATENT DOCUMENTS

EP 3222522 12/2021
WO 2005095209 10/2005
WO 2014035241 3/2014

OTHER PUBLICATIONS

European Patent Office; European Search Report dated Mar. 5, 2024 in Application No. 23275140.4.

*Primary Examiner* — Eret C Mcnichols
(74) *Attorney, Agent, or Firm* — SNELL & WILMER L.L.P.

(57) ABSTRACT

An aircraft first set of fastening apertures for providing connection to a second set of fastening apertures of the position adjustment part. The attachment structure comprises a first interface, and the position adjustment part comprises a second interface arranged to adjustably monument attachment apparatus comprising an attachment structure for attaching the monument attachment apparatus to an aircraft cabin surface, a bridge fitting, and a position adjustment part connectable between the attachment structure and the bridge fitting. The bridge fitting comprises a couple to the first interface such that that the position adjustment part can be selectively positioned relative to the attachment structure.

11 Claims, 3 Drawing Sheets

(56)                    References Cited

U.S. PATENT DOCUMENTS

| | | | |
|---|---|---|---|
| 2012/0153080 A1* | 6/2012 | Duggar | B64D 11/0023 |
| | | | 244/118.1 |
| 2013/0259562 A1 | 10/2013 | Burd | |
| 2014/0021297 A1* | 1/2014 | Klepka | B64D 11/04 |
| | | | 277/630 |
| 2022/0025918 A1* | 1/2022 | Head | B64D 11/0696 |
| 2024/0263665 A1* | 8/2024 | Marley | B64D 11/02 |

* cited by examiner

AIRCRAFT MONUMENT ATTACHMENT APPARATUS

CROSS-REFERENCE TO RELATED APPLICATIONS

This application claims priority to and the benefit of EP patent application Ser. No. 23/275,140.4, filed Sep. 22, 2023 and titled "AIRCRAFT MONUMENT ATTACHMENT APPARATUS," which is incorporated by reference herein in its entirety for all purposes.

FIELD

This disclosure relates generally to an aircraft monument attachment apparatus and more specifically, but not exclusively, to an aircraft monument attachment apparatus with reduced potential for slippage.

BACKGROUND

Aircraft cabin interior monuments, such as galleys, closets, partitions, lavatories, crew rest quarters, etc., are conventionally secured within an aircraft cabin using aircraft monument attachment apparatus. These apparatuses are secured to both the aircraft monument and a surface of the aircraft, e.g., the floor of the aircraft cabin, to ensure that the aircraft monument is appropriately positioned within the aircraft cabin. Aircraft monument attachment apparatus are conventionally attached to the aircraft cabin using one or more fixings, e.g., they may be bolted to a fixing point on the floor of the aircraft.

While aircraft monument attachment apparatuses are available in numerous configurations, existing designs have issues with slippage and bolt failure resulting from high levels of stress experienced by the fixings between the monument attachment apparatus and the aircraft cabin surface to which it is attached. Following bolt failure, replacement or repair aircraft of the monument attachment apparatus may be necessary. As aircraft monument attachment apparatus may require specialist installation, and are typically formed from high-precision machined aluminium and/or stainless steel, having a high manufacturing cost, replacement or repair is expensive. Reducing the failure rate of such apparatus is therefore desirable to reduce replacement and repair costs. It is also desirable to reduce the weight of aircraft monument attachment apparatus to minimize the total weight, and hence fuel consumption, of the aircraft in which it is situated in use.

The present disclosure aims to provide an improved aircraft monument attachment apparatus that addresses at least some of the above issues.

SUMMARY

According to a first aspect of this disclosure, there is provided an aircraft monument attachment apparatus comprising:

an attachment structure for attaching the monument attachment apparatus to an aircraft cabin surface;
a bridge fitting; and
a position adjustment part connectable between the attachment structure and the bridge fitting;
wherein the bridge fitting comprises a first set of fastening apertures for providing connection to the position adjustment part;

wherein the attachment structure comprises a first interface; and
wherein the position adjustment part comprises:
a second interface arranged to adjustably couple to the first interface of the attachment structure such that that the position adjustment part can be selectively positioned relative to the attachment structure; and
a second set of fastening apertures for providing connection to the bridge fitting;
wherein, in use:
the first set of fastening apertures of the bridge fitting at least partially overlaps with the second set of fastening apertures of the position adjustment part; and
the first interface and the second interface are coupled with the position adjustment part selectively positioned relative to the attachment structure.

Thus it will be seen that in accordance with this disclosure an aircraft monument attachment apparatus is provided comprising three separable components: an attachment structure for attachment to an aircraft cabin, a bridge fitting, and a position adjustment part that can be connected between the attachment structure and the bridge fitting to allow the position of the bridge fitting (and hence of any attached aircraft monument) to be selectively adjusted relative to the aircraft cabin.

The position adjustment part is adjustably coupled to the attachment structure in use, such that it can be selectively positioned relative to the attachment structure (and hence the aircraft cabin) along a first axis (e.g. the z-axis) while maintaining coupling between the two components. The first and second interfaces may be configured to couple using any appropriate mechanism. By "adjustably coupled" it will be understood that the first interface and the second interface may be coupled in a range of (e.g. z-axis) positions according to the required spacing between the attachment structure and the position adjustment part (and hence the bridge fitting). For example, the position adjustment part may be able to couple to the attachment structure at a plurality of locations, e.g. using an appropriate connector or plurality of connectors, or e.g., by floating.

In some examples, the second interface is arranged to adjustably couple to the first interface by using a continuous connector, such as a mating thread. For example, the first interface of the attachment structure may comprise a first threading. In some such examples, the second interface of the position adjustment part may comprise a second threading, configured to mate with the first threading of the attachment structure. By providing mating threads on interfaces of the position adjustment part and the attachment structure, the relative position of the two components may be adjusted by rotating the position adjustment part while allowing coupling to be maintained. The coupling between the position adjustment part and the bridge fitting may thus be adjusted depending on the requirements of the aircraft cabin in which it is installed.

In some other examples, a continuous connector is not required for adjustably coupling the second interface to the first interface. Instead, a discrete connector may be used, and the first and/or second interface may not comprise threading. For example, the attachment structure may comprise a plurality of slots at different positions, each able to fasten to a pin located on the position adjustment part. Alternatively, the position adjustment part may comprise a plurality of slots at different positions, each able to fasten to a pin of the attachment structure. The relative locations of the two components may thus be set based on the position of the slot in which the pin is fastened, i.e. the two components may be coupled in a plurality of selectable positions, depending on the requirements of the aircraft cabin in which the aircraft monument attachment apparatus is to be installed.

In some other examples, the second interface is arranged to adjustably couple to the first interface by using a floating joint. The use of a floating joint may allow for installation of the monument attachment apparatus to be simplified, and may facilitate fabrication as high precision parts such as threading are not required at the first and second interfaces of the attachment structure and the position adjustment part. In such examples, the first interface of the attachment structure may comprise one or more surfaces that mate with one or more corresponding surfaces of the second interface, so as to provide free positioning along a given axis (e.g. the z-axis).

The first set of apertures of the bridge fitting at least partially overlap with the second set of fastening apertures of the position adjustment part in use, such that fasteners, e.g. bolts, extending through the first and second sets of fastening apertures may be used to connect the bridge fitting to the position adjustment part. By varying the degree of overlap and using appropriate fasteners, the bridge fitting can be selectively positioned relative to the attachment structure (and hence the aircraft cabin) along two further axes (e.g. the x- and y-axes). Thus, the aircraft monument attachment apparatus of the present disclosure may allow for the position of an aircraft monument to be set relative to the aircraft cabin in three axes.

The attachment structure may be attached to an aircraft cabin surface in any appropriate way, provided that the second interface remains able to couple with the first interface of the position adjustment part. In some examples, the attachment structure may comprise securing means for securing the attachment structure to the aircraft cabin surface. The securing means may comprise any means for attaching the attachment structure to the aircraft cabin surface, such as an adhesive or a mechanical fixing. In some examples, the securing means may comprise a bolt. In some such examples, the bolt may comprise a threading configured to mate with a corresponding threading of the attachment structure and/or with a corresponding threading within the aircraft cabin surface. In some examples, the bolt may be arranged to extend through the first interface of the attachment structure into the aircraft cabin surface. In some examples, the securing means may be arranged such that it is at least partially contained within a body formed by the first interface and/or the second interface in use.

In some examples, the aircraft cabin surface may be the floor of an aircraft. In some such examples, the attachment structure may be attached directly to the aircraft floor, or may be attached into a beam beneath the floor surface, e.g., using a securing means such as a bolt that passes through the floor surface. In some alternative examples, the attachment structure may be secured to a seat track mounted on the floor of the aircraft. There is further disclosed an aircraft monument attachment apparatus according to any of the examples herein, wherein the attachment structure comprises means securing the attachment structure to an aircraft cabin floor. The adjustable coupling between the position adjustment part and the attachment structure can therefore provide for selectively positioning relative to the aircraft cabin floor along a first axis (e.g. the z-axis) that is in the vertical direction.

In some examples, the position adjustment part may comprise an upper section comprising the second set of fastening apertures and a lower section protruding from the upper section and comprising the second interface. In some examples the position adjustment part may be substantially T-shaped, e.g., comprising an upper section having a rectangular cross section and a lower section extending perpendicularly from the upper section and comprising the second interface.

The position adjustment part may comprise an upper surface in which the second set of fastening apertures is formed. The upper surface may be a surface of the upper section of the position adjustment part. The second set of fastening apertures may be openings in the upper surface of the position adjustment part. Thus, in some examples, the second set of fastening apertures may extend into the upper section of the position adjustment part from an upper surface of the position adjustment part.

The upper surface of the position adjustment part may be configured to sit flush against a corresponding lower surface of the bridge fitting in which the first set of fastening apertures is formed. This may provide greater contact between the position adjustment part and the bridge fitting so as to increase the friction between the two components, further reducing the likelihood of slippage of the bridge fitting relative to the position adjustment part. Thus, in some examples, the upper surface of the position adjustment part is configured to sit flush against a lower surface of the bridge fitting through which the first set of fastening apertures extends.

In some examples, the upper surface of the position adjustment part and/or the lower surface of the bridge fitting may be coated to increase the coefficient of friction between the surfaces, for example the position adjustment part may be coated in an anti-slip paint. This may further reduce the potential for slippage of the bridge fitting relative to the position adjustment part.

In some examples, the surface of position adjustment part and/or the bridge fitting may be textured so as to increase the coefficient of friction between the two surfaces, e.g. by applying a knurled or cross-hatched finish to one or both components. In some examples, in addition to or instead of increasing the coefficient of friction between the two surfaces themselves, an anti-slip material layer, e.g. a silicone rubber pad, may be provided between the two surfaces.

The first set of fastening apertures extend fully through the bridge fitting, e.g. through a lower surface of the bridge fitting. The second set of fastening apertures may extend partially or fully through the position adjustment part. In some examples, the monument attachment apparatus may comprise fastening means arranged to extend through one or more apertures of the first set of fastening apertures into one or more apertures of the second set of fastening apertures.

In some examples, the fasteners of the first and/or second set of fastening apertures may be substantially circular. In some examples, the first set of fastening apertures may comprise respective slots. In some examples, at least one fastening aperture of the second set of fasteners may comprise internal threading. By providing threading on an inner surface of apertures of second sets of fastening apertures, the second set of fastening apertures may enable a threaded fastener such as a bolt to secure the two components at one or more positions.

In some examples, the first set of fastening apertures may comprise a first bridge fitting fastening aperture and a second bridge fitting fastening aperture, and the second set of fastening apertures may comprise a corresponding first position adjustment part fastening aperture and a second position adjustment part fastening aperture. The bridge fitting and the attachment structure may be attached using the two sets of fastening apertures at two positions using appropriate fasteners.

In contrast to conventional designs, in which a single large fixing, e.g. a bolt, is used to attach the bridge fitting to an aircraft cabin surface, the aircraft monument attachment apparatus of the present disclosure can thus be used to secure the aircraft monument attachment apparatus within the aircraft cabin using a plurality of smaller fixings, e.g., three smaller fixings. For example, the attachment structure may be attached to a surface of the aircraft cabin using securing means, and the bridge fitting may be connected to the position adjustment part via the first and second sets of fastening apertures, e.g. using one or more fasteners, such as bolts, that extend through one or more apertures of the first set of fastening apertures and into one or more apertures of the second set of fastening apertures.

By using a plurality of separate fixings, e.g., three separate fixings, the stress experienced by each fixing can be reduced in comparison to conventional designs, reducing the likelihood of failure of any individual fixing. The likelihood of any individual fixing sliding in plane may also be reduced in comparison to single-fixing designs. In addition, as the alignment of the bridge fitting along a first axis, e.g. the z-axis, is set using a different part to that used to align the bridge fitting in the plane perpendicular to this axis, e.g., the x-y plane, the use of expensive-to-manufacture bushings to align the bridge fitting may be avoided.

As the aircraft monument attachment apparatus of the present disclosure is made up of three separable components, the size of the bridge fitting may be reduced in comparison to conventional designs in which the bridge fitting is connected directly to the aircraft cabin surface. In particular, in examples in which securing means are used to secure the attachment structure to the aircraft cabin surface, the stress experienced by the securing means is reduced in comparison to conventional designs. There is therefore a lower likelihood of fatigue or deflection failure of the securing means, meaning that a smaller securing means may be used than is possible in conventional designs.

The fastening apertures of the bridge fitting may have a greater extent, in at least one dimension, than the fastening apertures of the position adjustment part. This may allow the position of the bridge fitting to be adjusted in two dimensions (e.g. in the x-y plane) relative to the position adjustment part while still allowing a fastener to extend through the fastening aperture of the bridge fitting into a fastening aperture of the position adjustment part to attach the two components together. In some examples, the first bridge fitting fastening aperture may have a greater extent, in at least one dimension, than the corresponding first position adjustment part fastening aperture. In some examples the second bridge fitting fastening aperture may have a greater extent, in at least one dimension, than the corresponding second position adjustment part fastening aperture.

In some examples, the aircraft monument attachment apparatus may comprise fastening means arranged to extend through one or more apertures of the first set of fastening apertures into one or more apertures of the second set of fastening apertures. The bridge fitting may be fastened to the position adjustment part using the fastening means. In some such examples, the aircraft monument attachment apparatus may comprise first fastening means arranged to extend through a first bridge fitting fastening aperture into a first position adjustment part fastening aperture and/or second fastening means arranged to extend through a second bridge fitting fastening aperture into a second position adjustment part fastening aperture. The first fastening means may comprise a first bolt comprising a shank with a diameter that is smaller than the diameter of the first bridge fitting fastening aperture. The second fastening means may comprise a second bolt comprising a shank with a diameter that is smaller than the diameter of the second bridge fitting fastening aperture. By providing a bolt with a shank having a smaller diameter than the bridge fitting fastening aperture, the position of the bolt within the bridge fitting fastening aperture can be adjusted so as to allow the position of the bridge fitting to be adjusted with respect to the position adjustment part.

The bridge fitting may have any suitable shape for attaching to an aircraft monument while allowing for connection to the position adjustment part. In some examples, the bridge fitting may comprise one or more mounting holes for attaching the bridge fitting to an aircraft monument. The bridge fitting may comprise a lower section, which may have a substantially rectangular cross section in some examples. The first set of fastening apertures may comprise openings in the lower section of the bridge fitting that extend fully through the lower section of the bridge fitting. This may allow a fastening means, e.g. a bolt, to pass through one or more apertures of the first set of fastening apertures and into the second set of fastening apertures of the position adjustment part to allow the bridge fitting to be connected to the position adjustment part.

In some examples, the bridge fitting may comprise a cut-out. The cut-out may be located in the centre of the bridge fitting, such that the bridge fitting forms a frame surrounding a central cut-out. By providing a central cut-out in the bridge fitting, the weight of the bridge fitting may be reduced. The cut-out may be sized to accommodate fastening means for fastening the bridge fitting to the position adjustment part. As described above, the apparatus of the present disclosure may employ a plurality of fixings (e.g. securing means for attaching the attachment structure to the aircraft cabin, and fasteners for attaching the bridge fitting to the position adjustment part), each of which experiences less stress than the single fixing used in conventional designs. The size of each individual fixing of the present disclosure may thus be reduced. This in turn may allow the overall size of the monument attachment apparatus to be reduced, as the size of the cut-out within the structure required to accommodate the fixings can be minimized.

The use of an aircraft monument attachment apparatus made of separable components may allow installation of aircraft monuments to be simplified in comparison to conventional designs. In particular, the attachment structure and the position adjustment part can be secured to the aircraft cabin surface prior to installing the bridge fitting. This allows an installer to place an aircraft monument in its position after the attachment structure and position adjustment part are secured to the aircraft structure but prior to the installation of the bridge fitting. Once the aircraft monuments are in place, the bridge fitting can be attached to the aircraft monument and the position adjustment part with the aircraft monument in situ. This may be particularly beneficial where an aircraft monument must be secured to the aircraft body using multiple monument attachment apparatuses.

BRIEF DESCRIPTION OF THE DRAWINGS

Certain exemplary embodiments of this disclosure will now be described, with reference to the accompanying drawings, in which.

DETAILED DESCRIPTION

Figure 1B:
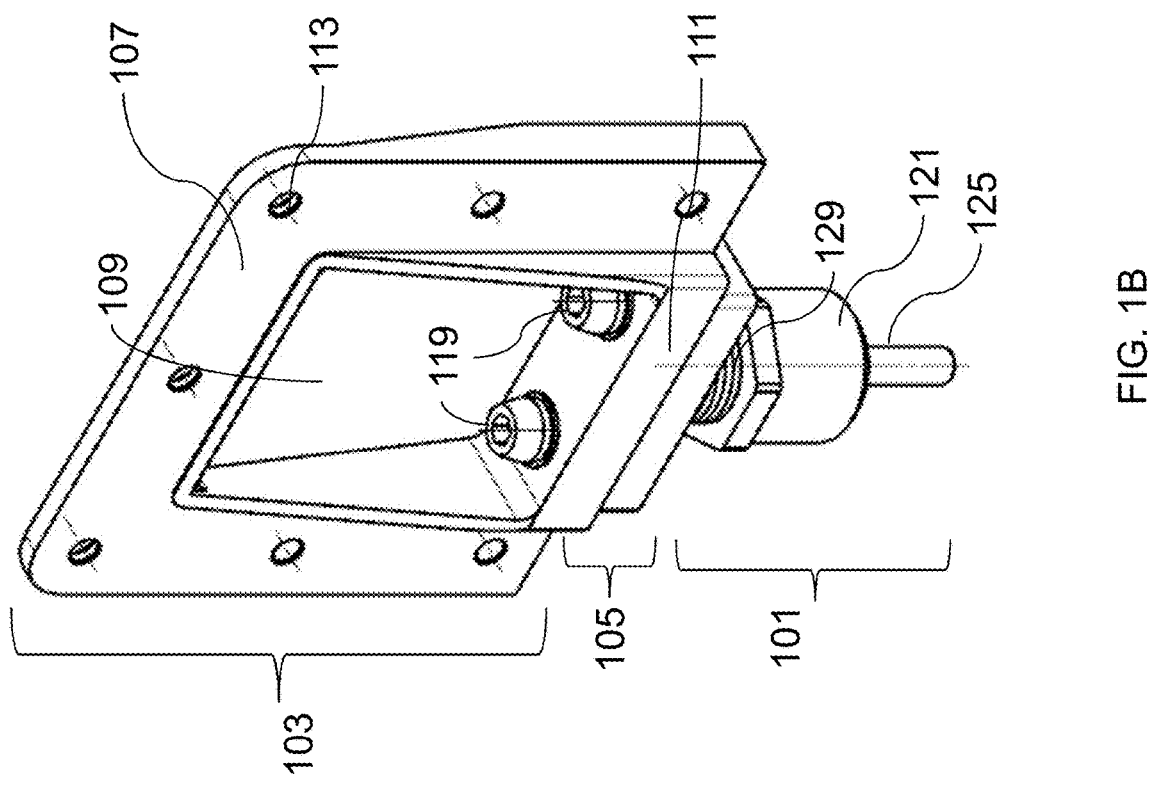
FIG. 1B is a perspective view of an aircraft monument attachment apparatus according to a first example of the present disclosure.
Figure 1A:
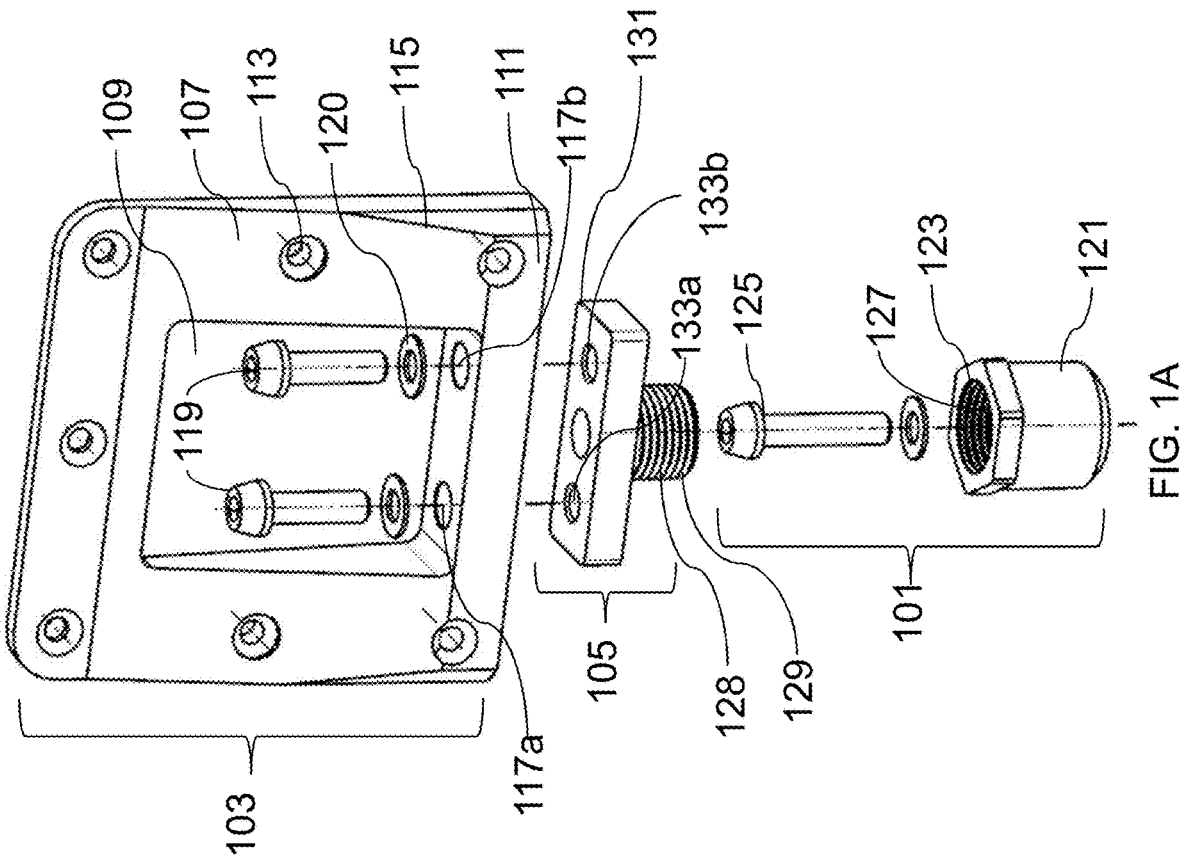
FIG. 1A is an exploded view of an aircraft monument attachment apparatus according to a first example of the present disclosure.
Figure 1D:
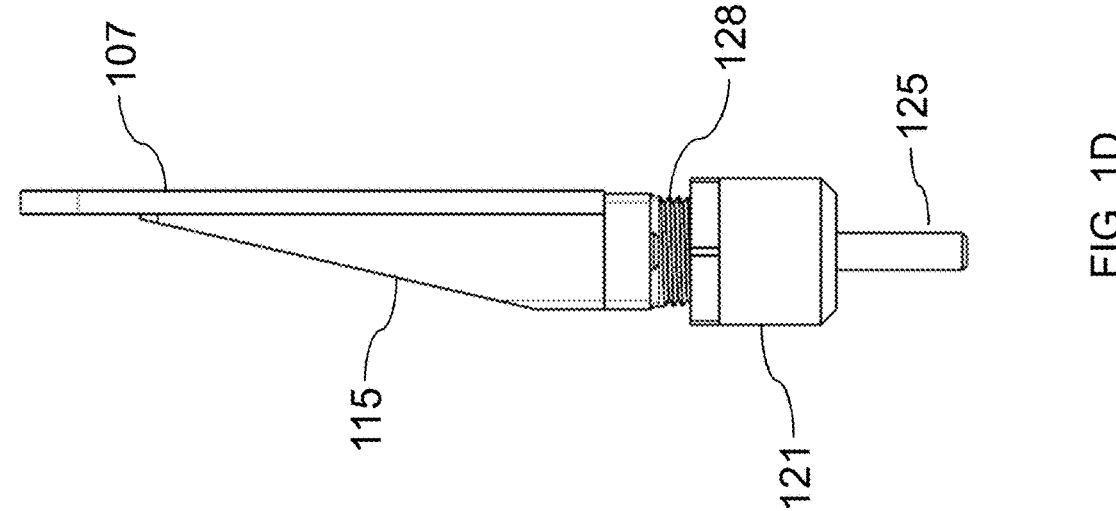
FIG. 1D is a side view of an aircraft monument attachment apparatus according to a first example of the present disclosure.
Figure 1C:
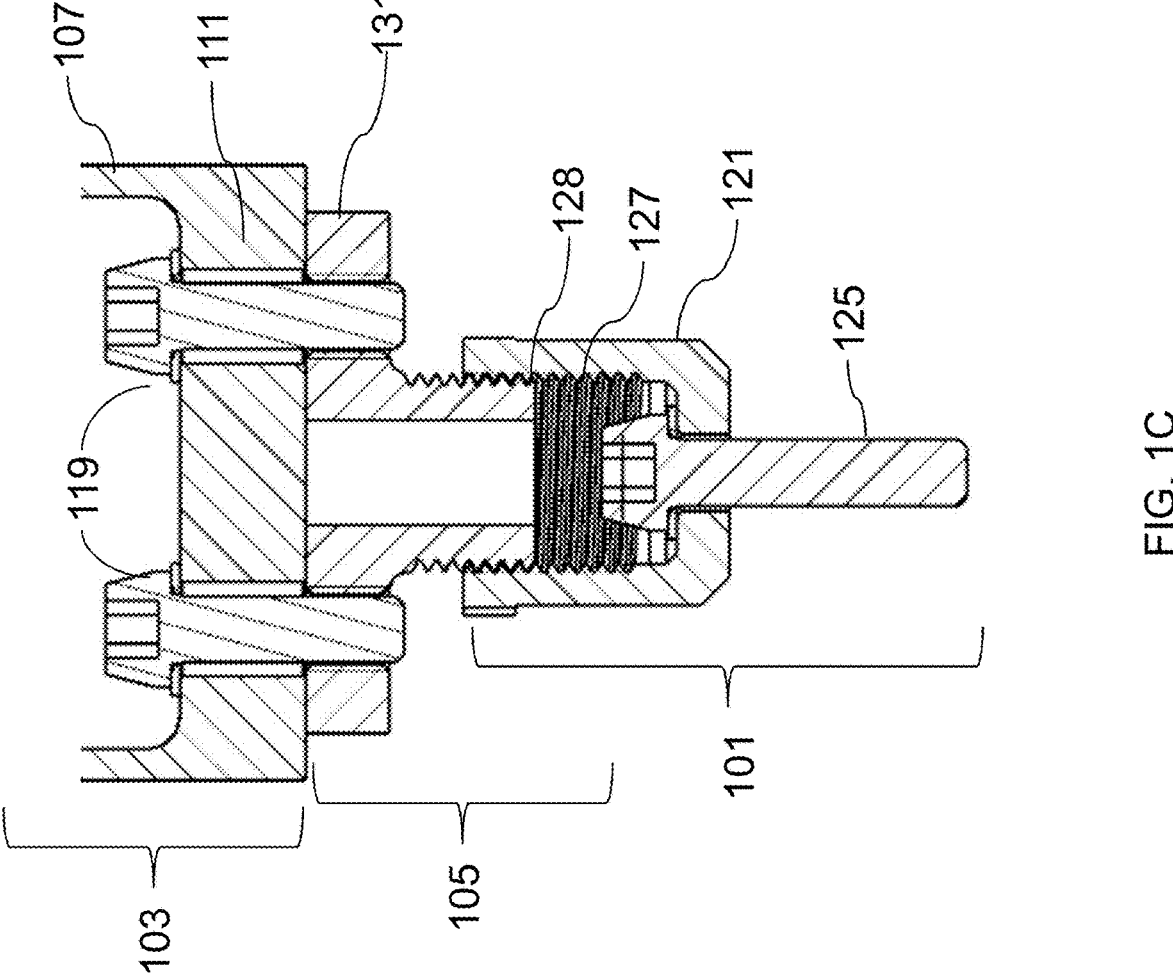
FIG. 1C is a cross section of an aircraft monument attachment apparatus according to a first example of the present disclosure.

FIGS. 1A and 1B show an aircraft monument attachment apparatus 100 according to an example of the present disclosure in exploded view (FIG. 1A) and as assembled for use in an aircraft cabin (FIG. 1B). FIGS. 1C and 1D show the aircraft monument attachment apparatus in cross-section and from a side view respectively.

The monument attachment apparatus 100 comprises an attachment structure 101 for attaching the monument attachment apparatus 100 to an aircraft cabin surface, a bridge fitting 103 for connecting the monument attachment apparatus to an aircraft monument, and a position adjustment part 105 for adjusting the relative positions of the bridge fitting 103 and the attachment structure 101.

The bridge fitting 103 comprises a main body 107, a central cut-out 109 and a lower section 111. The main body 107 of the bridge fitting 103 is used to connect the monument attachment apparatus 100 to an aircraft monument, such as, e.g., a galley or a partition, such that the aircraft monument can be secured to the aircraft cabin body. In use, the aircraft monument is secured to the bridge fitting 103 of the monument attachment apparatus 100 through a plurality of mounting holes 113 arranged through the main body 107 of the bridge fitting 103. The bridge fitting 103 is secured to the aircraft cabin body via the position adjustment part 105 and the attachment structure 101. As set out in more detail below, the bridge fitting 103 is secured to the position adjustment part 105 using bolts sized to fit within the central cut-out 109 of the bridge fitting 103. The position adjustment part 105 is coupled to the attachment structure 101 via a first interface 123 and a second interface 129, and the attachment structure 101 is secured to the aircraft cabin body using a bolt 125.

As illustrated in FIGS. 1B and 1D, one side of the main body 107 of the bridge fitting 103 is non-planar, having a curved portion 115 to reduce the weight of the bridge fitting 103. Although the main body 107 of the bridge fitting 103 is shown in FIGS. 1A and 1B as having a curved portion 115 on one side, it will be appreciated that this is not required in all examples. Instead, the shape of the main body 107 of the bridge fitting 103 can be adapted according to the offset requirements of the aircraft monument to which the bridge fitting 103 is to be mounted.

The lower section 111 of the bridge fitting 103 is used to secure the bridge fitting 103 to the position adjustment part 105 when the monument attachment apparatus 100 is in use. In the example shown in FIGS. 1A-1D, the lower section 111 of the bridge fitting 103 has a substantially rectangular cross section and extends across the central cut-out 109 of the bridge fitting 103.

A first set of fastening apertures, consisting of a first bridge fitting fastening aperture 117a and a second bridge fitting fastening aperture 117b in this example, extend through the lower section 111 of the bridge fitting to allow for connection to the position adjustment part 105. The fastening apertures 117a, 117b have a substantially circular cross section, and are arranged for use with bolts 119 that fasten the bridge fitting 103 to the position adjustment part 105, as illustrated in FIG. 1C. As will be explained in more detail below, the bolts 119 are preferably selected such that they are undersized with respect to the fastening apertures 117a, 117b, e.g. such that the diameter of the shank of the bolts 119 is smaller than the diameter of the fastening apertures 117a, 117b to allow for adjustment in the position of the bridge fitting 103 relative to the position adjustment part 105 during installation of the aircraft monument attachment apparatus 100.

The attachment structure 101 comprises an attachment body 121 and an interface 123. A securing means in the form of a bolt 125 is used to secure the attachment body 121 to an aircraft cabin surface when the monument attachment apparatus 100 is installed in an aircraft cabin. The bolt 125 extends through the interface 123 and the attachment body 121, such that the bolt 125 is at least partially contained within attachment body 121 in use. This can be clearly seen in FIGS. 1C and 1D, in which the head of the bolt 125 is fully contained within the attachment body 121, while the shank of the bolt 125 protrudes for connection to an aircraft cabin body in use.

In the example shown in FIGS. 1A-1D, the interface 123 of the attachment structure 101 comprises a threading 127, configured to mate with a corresponding threading 128 on an interface 129 of the position adjustment part 105, as shown in FIG. 1C. The use of corresponding threading 127, 128 allows the height of the position adjustment part 105 (and hence the bridge fitting 103) to be adjusted relative to the attachment structure 101 when the two components are coupled. In this way, the vertical position of the monument attachment apparatus 100 can be adjusted such that the mounting holes 111 of the bridge fitting 103 can be aligned with those of an aircraft monument to which the monument attachment apparatus 100 is to be connected.

The position adjustment part 105 comprises an upper section 131 and a lower section comprising an interface 129. The upper section 131 has a rectangular cross section and comprises a second set of fastening apertures in its upper surface. In the example shown in FIGS. 1A-1D, the second set of fastening apertures consists of a first position adjustment part fastening aperture 131a and a second position adjustment part fastening aperture 131b.

The first position adjustment part fastening aperture 131a and a second position adjustment part fastening aperture 131b have a substantially circular cross section, and extend fully through the upper section 131 of the position adjustment part 105 from its upper surface in this example, such that the bolts 119 extend all the way through the upper section 131 of the position adjustment part 105. The interior surface of the first position adjustment part fastening aperture 131a and the second position adjustment part fastening aperture 131b comprise threading (not shown for simplicity of illustration), arranged to couple to threading on the bolts 119. In this way, the bolts 119 of the bridge fitting 103 extend through the first set of fastening apertures 117a, 117b of the bridge fitting 103 into the second set of fastening apertures 133a, 133b of the position adjustment part 105, where they couple to the internal threading of the second set of fastening apertures 133a, 133b.

The first set of fastening apertures 117a 117b are larger than the second set of fastening apertures 133a, 133b so as to allow the position of the bridge fitting 103 to be adjusted in-plane relative to the position adjustment part 105 while still allowing the bolts 119 to attach the bridge fitting 103 to the position adjustment part 105. In the example shown in FIGS. 1A-1D, washers 120 are used to spread the load applied by each bolt 119 across the lower section 111 of the bridge fitting 103 regardless of the position of the bolts 119.

The interface 129 of the position adjustment part 105 comprises a cylindrical projection extending perpendicularly from a lower surface of the upper section 131. The cylindrical projection has a diameter smaller than the diameter of the interface 123 of the attachment structure 101, such that it can be contained within the interface 123, as shown in FIG. 1C. The surface of the interface 129 of the position adjustment part 105 comprises a threading 128 configured to mate with a corresponding threading 127 on the interface 123 of the attachment structure 101. Thus, by placing the interface 129 of the position adjustment part 105 against the interface 123 of the attachment structure 101 and rotating the position adjustment part 105, the threading 128 and 128 couple, attaching the position adjustment part 105 to the attachment structure 101. The position (height, in this example) of the position adjustment part 105 relative to the attachment structure 101 can thus be set by appropriate rotation of the position adjustment part 105 while the threading 128 and 129 are coupled.

The interfaces 123, 129 of the attachment structure 101 and the position adjustment part 105 therefore allow the position of the bridge fitting 103 (when connected to the position adjustment part 105) to be adjusted along a first axis. When combined with the in-place adjustment afforded by the different sizes of the first and second sets of fastening apertures, the position of the bridge fitting 103 can be adjusted in three dimensions so as to facilitate connection to an aircraft monument.

Although the interfaces 123 and 129 shown in FIGS. 1A-1D are shown as comprising threading 127 and 128 respectively, this is not required in all examples, and different interfaces may be used to provide an adjustable coupling between the attachment structure 101 and the position adjustment part 105. One example of an alternative interface is illustrated in FIG. 2.

Figure 2:
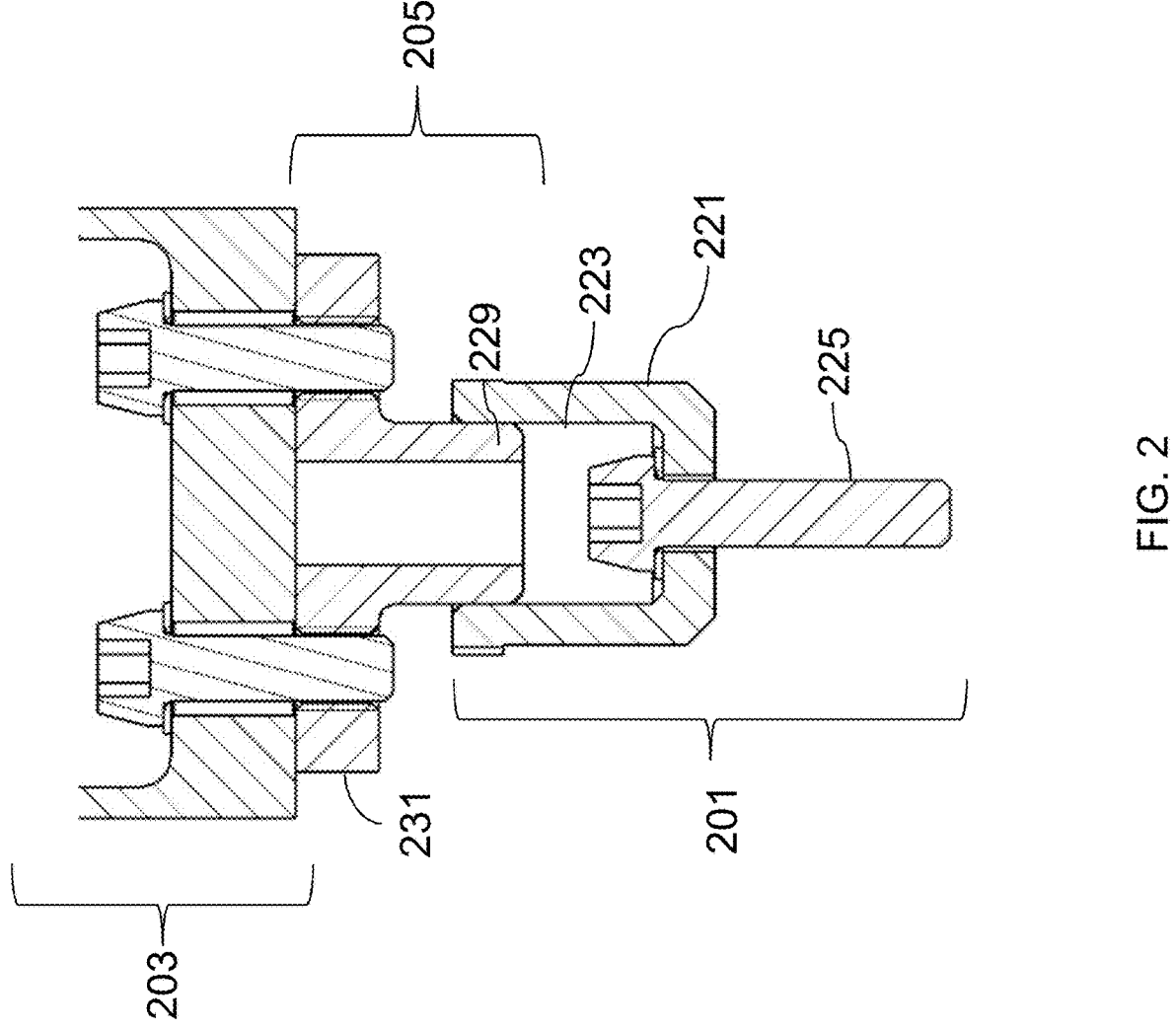
FIG. 2 is a cross section of an aircraft monument attachment apparatus according to a second example of the present disclosure.

FIG. 2 shows a monument attachment apparatus 200 according to a second example in cross-section. The monument attachment apparatus 200 comprises an attachment structure 201 for attaching the monument attachment apparatus 200 to an aircraft cabin surface, a bridge fitting 203 for connecting the monument attachment apparatus to an aircraft monument, and a position adjustment part 205 for adjusting the relative positions of the bridge fitting 203 and the attachment structure 201.

The monument attachment apparatus 200 functions similarly to the monument attachment apparatus 100 shown in FIGS. 1A-1D, with the exception of the coupling between the interfaces 223 and 229 of the attachment structure 201 and the position adjustment part 205 respectively. In contrast to the example shown in FIGS. 1A-1D, no threading is present on the interfaces 223 or 229. Instead, there is a floating joint between the two components, such that a surface of the interface 229 of the position adjustment part, located on an external surface of the cylindrical projection from the upper section 231, mates with a corresponding surface, located on an internal surface of the mounting body 221 of the mounting structure 201. The floating joint provides a coupling the two components, but allows free positioning of the position adjustment part 205 along one axis, e.g. in response to a shock or vibration of the aircraft cabin in which the monument attachment apparatus 200 is situated. The use of a floating joint may allow for installation of the monument attachment apparatus 200 to be simplified, and may allow for simpler fabrication than the monument attachment apparatus shown in FIGS. 1A-1D, as high precision threading is not required.

It will be appreciated by those skilled in the art that the present disclosure has been illustrated by describing one or more specific examples thereof, but is not limited to these examples; many variations and modifications are possible, within the scope of the accompanying claims.

What is claimed is:

1. An aircraft monument attachment apparatus comprising:
   an attachment structure for attaching the monument attachment apparatus to an aircraft cabin surface;
   a bridge fitting; and
   a position adjustment part connectable between the attachment structure and the bridge fitting;
   wherein the bridge fitting comprises:
      a first set of fastening apertures for providing connection to the position adjustment part;
   wherein the attachment structure comprises a first interface; and
   wherein the position adjustment part comprises:
      a second interface arranged to adjustably couple to the first interface of the attachment structure such that the position adjustment part can be selectively positioned relative to the attachment structure; and
      a second set of fastening apertures for connection to the bridge fitting;
   wherein, in use:
      the first set of fastening apertures of the bridge fitting at least partially overlaps with the second set of fastening apertures of the position adjustment part, and
      the first interface and the second interface are coupled with the position adjustment part selectively positioned relative to the attachment structure
   wherein the position adjustment part comprises:
      an upper section comprising the second set of fastening apertures; and
      a lower section protruding from the upper section and comprising the second interface,
   wherein the second set of fastening apertures extends into the upper section of the position adjustment part from an upper surface of the position adjustment part,
   wherein the upper surface of the position adjustment part is configured to sit flush against a lower surface of the bridge fitting through which the first set of fastening apertures extends, and
   wherein the upper surface of the position adjustment part and/or the lower surface of the bridge piece are coated to increase the coefficient of friction between the surfaces.

2. The aircraft monument apparatus of claim 1, wherein the first interface of the attachment structure comprises a first threading.

3. The aircraft monument attachment apparatus of claim 2, wherein the second interface of the position adjustment part comprises a second threading, configured to mate with the first threading of the attachment structure.

4. The aircraft monument attachment apparatus of claim 1, wherein the attachment structure comprises securing means for securing the attachment structure to the aircraft cabin surface.

5. The aircraft monument attachment apparatus of claim 4, wherein the securing means comprises a bolt arranged to extend through the first interface of the attachment structure into the aircraft cabin surface.

6. The aircraft monument apparatus of claim 4, wherein the securing means is arranged such that it is at least partially contained within a body formed by the first interface and/or the second interface in use.

7. The aircraft monument attachment apparatus of claim 1, further comprising fastening means arranged to extend through one or more apertures of the first set of fastening apertures into one or more apertures of the second set of fastening apertures.

8. The aircraft monument attachment apparatus of claim 1, wherein the first set of fastening apertures comprises a first bridge fitting fastening aperture and a second bridge fitting fastening aperture; and wherein the second set of fastening apertures comprises a corresponding first position adjustment part fastening aperture and a second position adjustment part fastening aperture.

9. The aircraft monument attachment apparatus of claim 8, wherein the first bridge fitting fastening aperture has a greater extent, in at least one dimension, than the corresponding first position adjustment part fastening aperture; and/or wherein the second bridge fitting fastening aperture has a greater extent, in at least one dimension, than the corresponding second position adjustment part fastening aperture.

10. The aircraft monument attachment apparatus of claim 8, further comprising:

first fastening means arranged to extend through the first bridge fitting fastening aperture into the first position adjustment part fastening aperture; and/or second fastening means arranged to extend through the second bridge fitting fastening aperture into the second position adjustment part fastening aperture.

11. The aircraft monument attachment apparatus of claim 1, wherein the bridge fitting comprises one or more mounting holes for connection to an aircraft monument.

\* \* \* \* \*